United States Patent [19]

Batz

[11] 3,823,355

[45] July 9, 1974

[54] CONTACTLESS SWITCH DEVICE

[75] Inventor: James E. Batz, Northbrook, Ill.

[73] Assignee: Northern Illinois Gas Company, Aurora, Ill.

[22] Filed: Nov. 12, 1971

[21] Appl. No.: 198,305

[52] U.S. Cl.......... 317/246, 200/DIG. 1, 317/249 R, 317/251, 340/365 C

[51] Int. Cl............................................. H01g 5/14

[58] Field of Search..... 340/365 C; 317/246, 249 R, 317/251; 200/DIG. 1; 333/24 C

[56] References Cited

UNITED STATES PATENTS

| | | | |
|---|---|---|---|
| 986,651 | 3/1911 | Stone | 317/249 R |
| 1,992,433 | 2/1935 | Klotz | 333/24 C |
| 3,306,104 | 2/1967 | Corcoran | 317/249 R |
| 3,310,760 | 3/1967 | Swan | 333/24 C |

FOREIGN PATENTS OR APPLICATIONS

| | | | |
|---|---|---|---|
| 937,831 | 2/1953 | Great Britain | 317/249 R |

*Primary Examiner*—E. A. Goldberg
*Attorney, Agent, or Firm*—John A. Dienner

[57] ABSTRACT

A contactless switch device for coupling one or more electrical input signals of predetermined phase to an output sensing circuit wherein a plurality of parallel spaced insulating members are movable relative to each other upon depressing a control plate and have electrical conductive surface areas selectively disposed thereon. Excitation signals of predetermined phase are directly connected to selected of the conductive surface areas and are capacitive coupled to sensor elements upon depressing the control plate, electrostatic shield means minimizing coupling of the signals to the sensor elements when the control plate is in its normal nondepressed position.

11 Claims, 2 Drawing Figures

CONTACTLESS SWITCH DEVICE

BACKGROUND OF THE INVENTION

The present invention relates generally to keyboard switch arrangements, and more particularly to a contactless switch device for use with a keyboard arrangement and the like wherein the switch includes novel means for coupling one or more excitation signals of predetermined phase to an output sensing circuit.

With recent advances in computer technology and information handling equipment, manufacturers have devised a number of keyboard arrangements employing various switch devices for coupling electrical input signals to output sensing means, the output signals from the switch devices being either self-coded or being connected through an output sensing circuit to suitable circuitry to establish binery coded words representing the particular key button depressed. Among the various types of switch units available are reed switches employing movable magnets to actuate either dry or mercury wetted reed contacts, and self-coding mechanical contact switches having movable plates with multiple arm contacts selectively engageable with contact pins through aperture patterned masks. These switch devices are of the contact type and have the disadvantage that they frequently exhibit bounce characteristics that reduce efficiency of the switches and are highly undesirable in high speed switching operations as are necessary in the computer and information handling fields.

A number of contactless type switches have been developed in an attempt to overcome the disadvantages of contact type switches for computer applications. Such contactless type switches include Hall generating switching devices, resistor semiconductor switches which generally depend on a second-order Hall effect to change their ohmic value, saturable core type switches, capacitor couplings switches, and proximity transducer switches. While the known contactless switches have proven to be more efficient and reliable than contact type switches, their performance characteristics have not been altogether satisfactory. The present invention is directed to a contactless switch arrangement of the capacitor coupling type and provides a highly efficient and reliable switch which is particularly useful for keyboards of computers and other information handling equipment.

SUMMARY OF THE INVENTION

One of the primary objects of the present invention is to provide a contactless switch device having novel means for coupling one or more excitation signals of predetermined phase to an output sensing circuit whereupon the signals coupled over the output sensing circuit may be converted to a binery coded word representing the particular keyboard switch actuated.

Another object of the present invention is to provide a contactless switch device for use in selectively coupling electrical excitation signals of predetermined phase to an output sensing circuit, which switch includes a plurality of parallel spaced fixed and movable insulating members having electrical conductive surface areas provided thereon, selected ones of the conductive surfaces being connected to the excitation signals and the pattern of conductive surfaces being effective to capacitive couple the input signals to sensor element means upon selective positioning of the conductive surfaces relative to each other.

Another object of the present invention is to provide a contactless switch device as described including electrostatic shield means disposed between the electrical conductive surface areas and the sensor means to minimize unintended capacitive coupling of the excitation signals to the sensor means.

Another object of the present invention is to provide a contactless switch device as described wherein alternate insulating members are connected for simultaneous movement in directions parallel to the remaining fixed insulating members, the movable insulating members having electrical conductive surface areas thereon which in first positions are ineffective to establish capacitive coupling with sensor means disposed on selected ones of the fixed insulating members but which upon movement to second positions are effective to establish capacitive coupling of excitation signals with the sensor means.

In carrying out the objects and advantages of the present invention, a contactless switch device in accordance with one embodiment of the present invention includes a plurality of insulating members which are supported in parallel spaced relation. Alternate ones of the insulating members are connected through a control knob or plate for simultaneous movement in directions parallel to the remaining insulating members which are supported in fixed position. The fixed and movable insulating members have electrical conductive surface areas thereon disposed in a predetermined pattern. The conductive surface areas on the fixed insulating members are directly connected to AC excitation signals of predetermined phase, and selected ones of the fixed insulating members have conductive sensor element means thereon which are shielded from the excitation signals by electrostatic shield means. The electrical conductive surface areas on the movable insulating members have areas sufficient to effect capacitive coupling of the excitation signals to the sensor means upon movement of the movable insulating members to switching positions. The signals coupled over the switch sensor elements are coupled over an output sensing circuit to suitable circuitry for converting the phase signals to a set of binery coded words representing the particular switch device actuated.

Further objects and advantages of the present invention, together with the organization and manner of operation thereof, will become apparent from the following detailed description of a preferred embodiment of the invention when taken in conjuction with the accompanying drawings wherein like reference numerals designate like parts throughout the several views.

DESCRIPTION OF A PREFERRED EMBODIMENT

Figure 1:
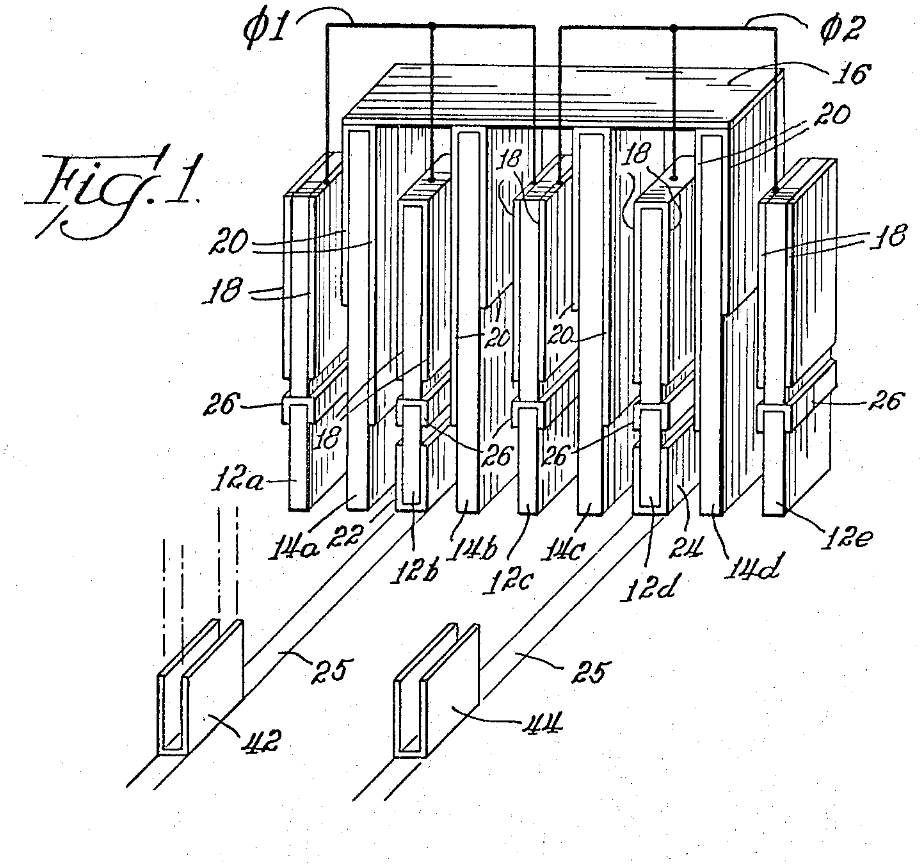
FIG. 1 is a schematic illustration of a contactless switch device in accordance with one embodiment of the present invention.

Referring now to the drawings, a contactless switch device in accordance with one embodiment of the present invention is indicated generally at 10. The contactless switch device 10 may comprise one switch device operative in conjunction with a keyboard arrangement employing a plurality of such switch devices such as in conventional computers and information handling equipment. The switch device 10 includes a plurality of insulating members comprising fixedly positioned insulating members 12*a*, 12*b*, 12*c*, 12*d* and 12*e*, and movable insulating members 14*a*, 14*b*, 14*c* and 14*d*. The fixed and movable insulating members are disposed in parallel spaced relation, with the movable insulating members being interposed between the fixed insulating members in alternating fashion as shown. The upper ends of the movable insulating members 14*a*–14*d* are connected to a common control plate 16 which is made of a nonconducting material and schematically represents a keyboard button or switch actuating knob. Depression of the control plate 16 effects downward movement of the associated insulating plates 14*a*–14*d* in directions parallel to the planes of the fixed insulating members 12*a*–12*e*. The insulating members 12*a*–12*e* are maintained in fixed relative position by suitable means (not shown) such as a nonconducting base means of plastic, hard rubber or other suitable nonconducting material.

Each of the fixed insulating members 12*a*–12*e* has electrical conductive surface means 18 thereon which may comprise sheet-like coatings or layers of a suitable electrical conducting material. As shown, the electrical conductive surfaces 18 formed on the side surfaces of the fixed insulating members 12*b* and 12*d* are connected at their uppermost edges through conductive layers disposed on the upper horizontal surfaces of the insulating members 12*b* and 12*d*. Each of the movable insulating members 14*a*–14*d* has electrically conductive surface means 20 thereon comprising sheets of suitable electrical conducting material having the same electrical conduction characteristics as the electrical conducting surfaces 18 on the fixed insulating members 12*a*–12*e*.

In the particular switch embodiment illustrated, the single switch 10 is adapted for direct connection to two AC excitation signals $\phi 1$ and $\phi 2$ of different phase, with the fixed and movable insulating members and their associated electrical conductive surfaces being equally divided or grouped for association with the excitation signals. To this end, an equal number of fixed and movable insulating members are associated with each of the input AC excitation signals $\phi 1$ and $\phi 2$. The fixed insulating members 12*a*, 12*b* and the left-hand conductive surface 18 on the insulating member 12*c* are schematically illustrated as being hard connected to the phase $\phi 1$ AC excitation input signal, while the fixed insulating members 12*d*, 12*e* and the right-hand conducting surface 18 on the insulating member 12*c* are shown hard connected to the second phase $\phi 2$ input excitation signal. The movable insulating members 14*a* and 14*b* disposed in alternate relation between the fixed insulating members 12*a*, 12*b* and 12*c* are thus associated with the first phase $\phi 1$ excitation signal, while the movable insulating members 14*c* and 14*d* interposed in alternating relation between the fixed insulating members 12*c*, 12*d* and 12*e* are thus associated with the second phase $\phi 2$ excitation signal.

The contactless switch device 10 includes sensor element means associated with each of the input excitation phase signals. The sensor element means associated with the first excitation phase $\phi 1$ comprise an electrical conductive surface 22 disposed on the lower side surfaces and lower horizontal end surface of the insulating member 12*b*. The sensor element means associated with the second excitation phase $\phi 2$ comprise an electrical conductive surface 24 formed on the lower side surfaces and lower horizontal end surface of the fixed insulating member 12*d*. Each of the sensor means is connected to suitable conductor means, indicated schematically at 25.

Each of the fixed insulating members 12*a*–12*e* has electrostatic shield means 26 thereon comprising an electrical conductive member secured to the associated insulating member to form an electrostatic shield between the conductive surfaces 18 and 22 and 24. As shown in FIG. 1, the planar areas of the conductive surfaces 20 on the opposite sides of each of the movable conductors 14*a*–14*d* are such that when the control plate 16 is depressed to substantially engage the upper ends of the fixed insulating members 24, the conductive surfaces 20 are substantially exactly opposite and of equal area to the conductive surfaces 18 on the fixed insulating members. In addition, the planar areas of conductive surfaces 20 opposite the insulating members having the sensor means 22 and 24 thereon are such that they will be disposed opposite the conductive sensor means 22 and 24 when the control plate 16 is depressed.

In operation, when the electrical conductive surfaces 18 on the fixed insulating members 12*a*–12*e* are directly connected to either of the excitation signals $\phi 1$ or $\phi 2$, signals of like phase are capacitive coupled into the associated conductive surfaces 20 on the movable insulating members 14*a*–14*d*. When the control plate 16 is depressed, as in depressing a key button on a keyboard, to move the movable conductor members to their lowered positions wherein the conductive surfaces on the respective fixed and movable insulating members are in substantially exact opposed relation, the phase $\phi 1$ signals appearing on the conductive surfaces 18 of the fixed insulating members are capacitive coupled through the corresponding conductive surfaces 20 on the movable insulating members into the sensor means 22. Similarly, the phase $\phi 2$ signals appearing on the conductive surfaces 18 are capacitive coupled through the associated conductive surface 20 into the sensor means 24. Prior to depressing the control plate 16, weak signals of either phase $\phi 1$ or $\phi 2$ will be present on the sensor means 22 and 24. When the control plate 16 is depressed to move the movable insulating members 14*a*–14*d* downwardly to their operative positions, signals coupled by the conductive coatings on the movable insulating members will override any stray signals appearing on the sensor elements 22 and 24.

Figure 2:
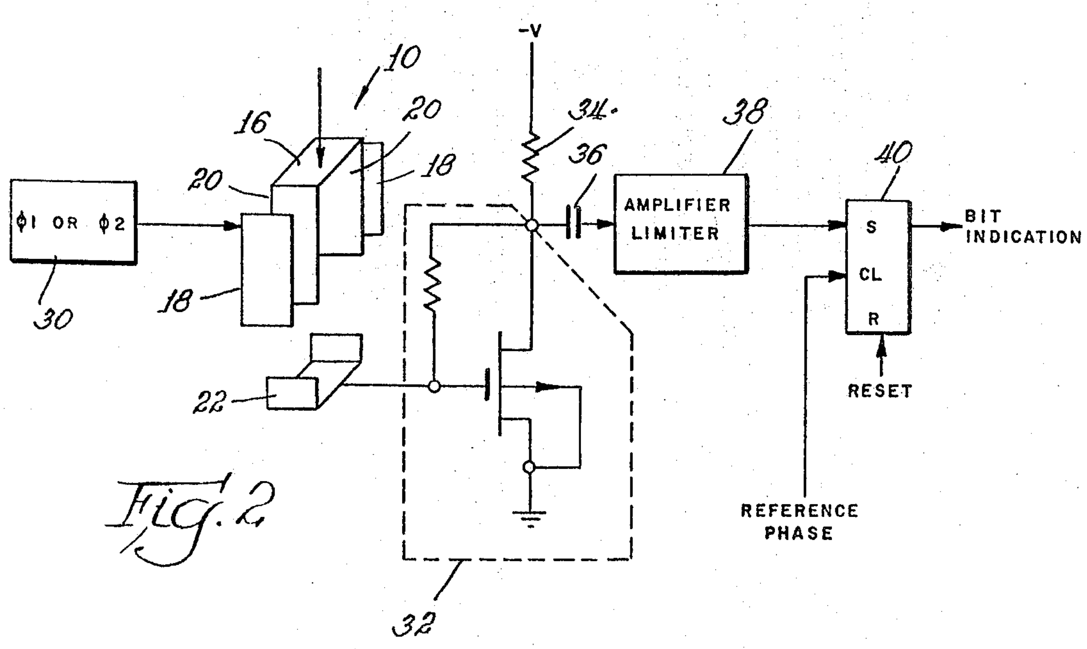
FIG. 2 is a schematic circuit diagram illustrating one sensor of the contactless switch device of FIG. 1 coupled to an output sensing circuit.

FIG. 2 schematically illustrates one sensor means, such as 22, of the contactless switch device 10 connected to an output sensing circuit for determining the resultant phase of an AC excitation signal, either $\phi 1$ or $\phi 2$, appearing at the sensor means 22 of the contactless switch device. The excitation signal is supplied to the conductive surface 18 of the switch by an excitation oscillator 30. The output sensing circuit shown in FIG. 2 is only by way of example and, per se, forms no part of the present invention. Determining the resultant phase of a signal appearing at a given sensor means, such as sensor 22, serves to establish the binery ONE and ZERO conditions for the particular switch device of the keyboard which is actuated. The signals appearing at sensor 22 upon depressing the control plate 16 are connected to the gate lead of an enhancement mode field-effect transistor 32. The field-effect transistor has a drain lead connected through a resistor 34 to a voltage source - V. The source lead of the field-effect transistor is grounded so that the field-effect transistor 32 is biased in the active region and acts as a high gain amplifier. The output of the field-effect transistor 32 is coupled through a capacitor 36 to the input of an amplifier limiter 38. The output of the amplifier limiter 38 is connected to the set input S of a phase comparison or detect flip-flop 40 which is clocked by one of the phases signals provided by the excitation oscillator 30. The flip-flop 40 serves to compare the phase of the set input S from the amplifier limiter 38 to the phase signal extended to the clock input CL and provides a first logic level output when the phases are the same and a second logic level output when the phases are different, thereby providing phase detection.

While the embodiment of the contactless switch device 10 described above employs a pair of sensor elements 22 and 24 for the single key or button control 16, sensor elements defining a given encoding bit of several switches can be connected together. For example, FIG. 1 shows a pair of second sensor elements 42 and 44 which are connected respectively, to sensor elements 22 and 24 and comprise the sensor means for a second switch device (not shown). In such instance, only one active sensor element for each encoding bit would be required for the several switch buttons. The number of switches that can be connected to a common sensor element is determined by the stray capacities in the wiring and the effective signal, either phase $\phi 1$ or phase $\phi 2$, coupling within the keyboard switch under consideration.

While one embodiment of the present invention has been shown and described, it will be obvious to those skilled in the art that changes and modifications may be made therein without departing from the invention in its broader aspects.

I claim:

1. In a contactless switch device for selectively coupling at least one electrical input signal of predetermined phase to an output sensing circuit, the combination comprising, at least one fixed insulating member, at least one insulating member movable in a plane parallel to and spaced from the plane of the first element, first electrical conductive surface means supported on one of said fixed or movable insulating members for direct connection to an AC excitation signal, electrical conductive sensor means supported on said one of said fixed or movable insulating members spaced from said first conductive surface means thereon and electrically insulated from said first electrical conductive surface means, electrostatic shield means supported on said one of said fixed or movable insulating members intermediate said first conductive surface means and said sensor means to minimize direct capacitive coupling therebetween, second conductive surface means supported on the other of said fixed or movable insulating members in opposed spaced relation to said first conductive surface means for capacitive coupling therewith when said movable member is disposed in a first position, said second conductive surface means being adapted to effect capacitive coupling of the AC excitation signal between said first electrical conductive surface means and said sensor means over said second conductive surface means when said movable insulating member is moved to a second switching position, and means for moving said movable insulating member between said first and second positions.

2. The combination of claim 1 wherein each of said fixed and movable insulating members are generally planar.

3. The combination of claim 2 wherein said first conductive surface means is supported on said fixed insulating member adjacent one end thereof, said sensor means being supported on said fixed insulating member spaced from said first conductive surface means, and said electrostatic shield means being supported on said fixed insulating member intermediate said first conductive surface means and said sensor means.

4. The combination of claim 3 wherein said second conductive surface means is supported on said movable insulating member and has a conductive surface area sufficient to establish capacitive coupling with said first conductive surface means when said movable insulating member is in its said first position, said second conductive surface means further being sufficient to effect capacitive coupling with said sensor means when said movable insulating member is moved to its said second position.

5. In a contactless switch device for selectively coupling electrical input signals of predetermined phase to an output sensing circuit, the combination comprising, a plurality of insulating members supported in parallel spaced relation, alternate ones of said insulating members being fixed and the remaining insulating members being movable in a direction parallel to the planes of the fixed elements, means interconnecting said movable insulating members for movement thereof between first and second positions relative to said fixed insulating members, first electrical conductive surface means supported on selected ones of the said fixed or movable insulating members and adapted for direct conductive connection to at least one AC excitation signal of predetermined phase, electrical conductive sensor means supported on said selected ones of said insulating members in spaced relation from said first conductive surface means thereon, and second conductive surface means supported on the remaining insulating members for capacitive coupling with said first conductive surface means when said movable insulating members are in their said first positions, said second conductive surface means being sufficient in area to effect capacitive coupling of signals from said first conductive surface means into said sensor means when said movable insulating members are disposed in their second positions.

6. The combination of claim 5 wherein said insulating members comprise thin generally planar members.

7. The combination of claim 5 wherein said means interconnecting said movable insulating members includes a control plate fixedly secured to end surfaces of said movable insulating members for effecting simultaneous movement thereof upon movement of said control plate.

8. The combination of claim 5 wherein said selected ones of said fixed or movable insulating members and their associated first electrical conductive surface means are grouped for connection of each group to an AC excitation signal of a predetermined phase.

9. The combination of claim 5 wherein said first electrical conductive surface means are supported on each of said fixed insulating members generally adjacent end portions thereof, said conductive sensor means being supported on each of said fixed insulating members spaced from said first conductive surface means thereon, and including electrostatic shield means supported on each of said fixed insulating members intermediate the sensor means and first conductive surface means thereon.

10. The combination of claim 9 wherein said second conductive surface means are supported on each of said movable insulating members and include conductive surface areas disposed in opposed relation to the first conductive surface means disposed on the next adjacent fixed insulating members, said second conductive surface means being adapted to effect capacitive coupling of an AC excitation signal of like phase as received from said first conductive surface means into said sensor means upon movement of said movable insulating members to their said second positions.

11. In a contactless switch device for providing coded output signals which identify said switch device, input means including a first and a second input member, means for extending signals of a first phase to said first input member and signals of a second phase to said second input member, sensor means including a first sensor element associated with said first input member and a second sensor element associated with said second input member, signal coupling means including first and second signal coupling members, and key means for moving said first and second signal coupling members from a first position to a second position to bring said first signal coupling member to a juxtapositioned, spaced relationship with said first input member and said first sensor element and said second signal coupling member to a juxtapositioned, spaced relationship with said second input member and said second sensor element to provide a first electrostatic path for the signals of said first phase between said first signal coupling member and said first sensor element and a second electrostatic path for the signals of said second phase between said second input member and said second sensor element.

* * * * *